United States Patent
Gurindapalli et al.

(10) Patent No.: US 11,204,708 B2
(45) Date of Patent: Dec. 21, 2021

(54) SYSTEM AND METHOD FOR AN OFFLINE MIGRATION OF ON-PREMISE ENVIRONMENT TO A CLOUD-BASED SERVICE

(71) Applicant: EMC IP Holding Company LLC, Hopkinton, MA (US)

(72) Inventors: Aneesh Kumar Gurindapalli, Vijayawada (IN); Deepthi Urs, Bangalore (IN); Mahesh Reddy Appireddygari Venkataramana, Bangalore (IN); Swaroop Shankar D H, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 16/779,711

(22) Filed: Feb. 3, 2020

(65) Prior Publication Data
US 2021/0240378 A1    Aug. 5, 2021

(51) Int. Cl.
*G06F 12/00* (2006.01)
*G06F 3/06* (2006.01)
*G06F 9/54* (2006.01)
*G06F 11/14* (2006.01)

(52) U.S. Cl.
CPC ............ *G06F 3/0647* (2013.01); *G06F 3/067* (2013.01); *G06F 3/0614* (2013.01); *G06F 3/0659* (2013.01); *G06F 9/542* (2013.01); *G06F 11/1451* (2013.01); *G06F 11/1461* (2013.01); *G06F 11/1464* (2013.01); *G06F 11/1469* (2013.01)

(58) Field of Classification Search
CPC .... G06F 3/0647; G06F 3/0614; G06F 3/0659; G06F 3/067; G06F 9/542; G06F 11/1451; G06F 11/1461; G06F 11/1464; G06F 11/1469
See application file for complete search history.

(56) References Cited

U.S. PATENT DOCUMENTS

| | | | |
|---|---|---|---|
| 2017/0251013 A1* | 8/2017 | Kirti | ................... H04L 63/1441 |
| 2017/0262347 A1* | 9/2017 | Dornemann | ......... G06F 9/45558 |
| 2021/0034571 A1* | 2/2021 | Bedadala | .............. G06F 16/172 |

OTHER PUBLICATIONS

"Email Migration to Office 365" Quadrotech, 2017 (24 pages).

\* cited by examiner

*Primary Examiner* — Shawn X Gu
(74) *Attorney, Agent, or Firm* — Chamberlain, Hrdlicka, White, Williams & Aughtry (57) ABSTRACT

A method for managing data includes obtaining, by a backup agent, a migration request, wherein the migration request specifies a plurality of users, and in response to the migration request: identifying a set of source-format data sets in a backup storage system, mounting the set of source-format data sets from the backup storage system, performing data mining on the set of source-format data sets in response to the mounting to obtain a hierarchical structure, generating a cloud-based service user account for each user of the plurality of users, wherein the cloud-based service user accounts are associated with a cloud-based service, obtaining source-format data sets associated with each user of the plurality of users using the hierarchical structure, and initiating a migration of the source-format data sets to the cloud-based service.

20 Claims, 7 Drawing Sheets

SYSTEM AND METHOD FOR AN OFFLINE MIGRATION OF ON-PREMISE ENVIRONMENT TO A CLOUD-BASED SERVICE

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The migration of the generated data may impact the overall performance of the computing resources.

SUMMARY

In general, in one aspect, the invention relates to a method for managing data. The method includes obtaining, by a backup agent, a migration request, wherein the migration request specifies a plurality of users, and in response to the migration request: identifying a set of source-format data sets in a backup storage system, mounting the set of source-format data sets from the backup storage system, performing data mining on the set of source-format data sets in response to the mounting to obtain a hierarchical structure, generating a cloud-based service user account for each user of the plurality of users, wherein the cloud-based service user accounts are associated with a cloud-based service, obtaining source-format data sets associated with each user of the plurality of users using the hierarchical structure, and initiating a migration of the source-format data sets to the cloud-based service.

In general, in one aspect, the invention relates to a system that includes a processor and memory that includes instructions, which when executed by the processor, perform a method. The method includes obtaining, by a backup agent, a migration request, wherein the migration request specifies a plurality of users, and in response to the migration request: identifying a set of source-format data sets in a backup storage system, mounting the set of source-format data sets from the backup storage system, performing data mining on the set of source-format data sets in response to the mounting to obtain a hierarchical structure, generating a cloud-based service user account for each user of the plurality of users, wherein the cloud-based service user accounts are associated with a cloud-based service, obtaining source-format data sets associated with each user of the plurality of users using the hierarchical structure, and initiating a migration of the source-format data sets to the cloud-based service.

In general, in one aspect, the invention relates to a non-transitory computer readable medium that includes computer readable program code, which when executed by a computer processor enables the computer processor to perform a method for managing data. The method includes obtaining, by a backup agent, a migration request, wherein the migration request specifies a plurality of users, and in response to the migration request: identifying a set of source-format data sets in a backup storage system, mounting the set of source-format data sets from the backup storage system, performing data mining on the set of source-format data sets in response to the mounting to obtain a hierarchical structure, generating a cloud-based service user account for each user of the plurality of users, wherein the cloud-based service user accounts are associated with a cloud-based service, obtaining source-format data sets associated with each user of the plurality of users using the hierarchical structure, and initiating a migration of the source-format data sets to the cloud-based service.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relate to performing a migration of users and user data in an on-premise environment to a cloud service in a target format. Embodiments of the invention include performing a data mining on the source format backups, identifying users to be migrated, and grouping the users into user batches. For each user batch, the user data is identified, obtained in temporary files, converted from a source format to a target format, and, migrated to the cloud-based service.

Figure 1:
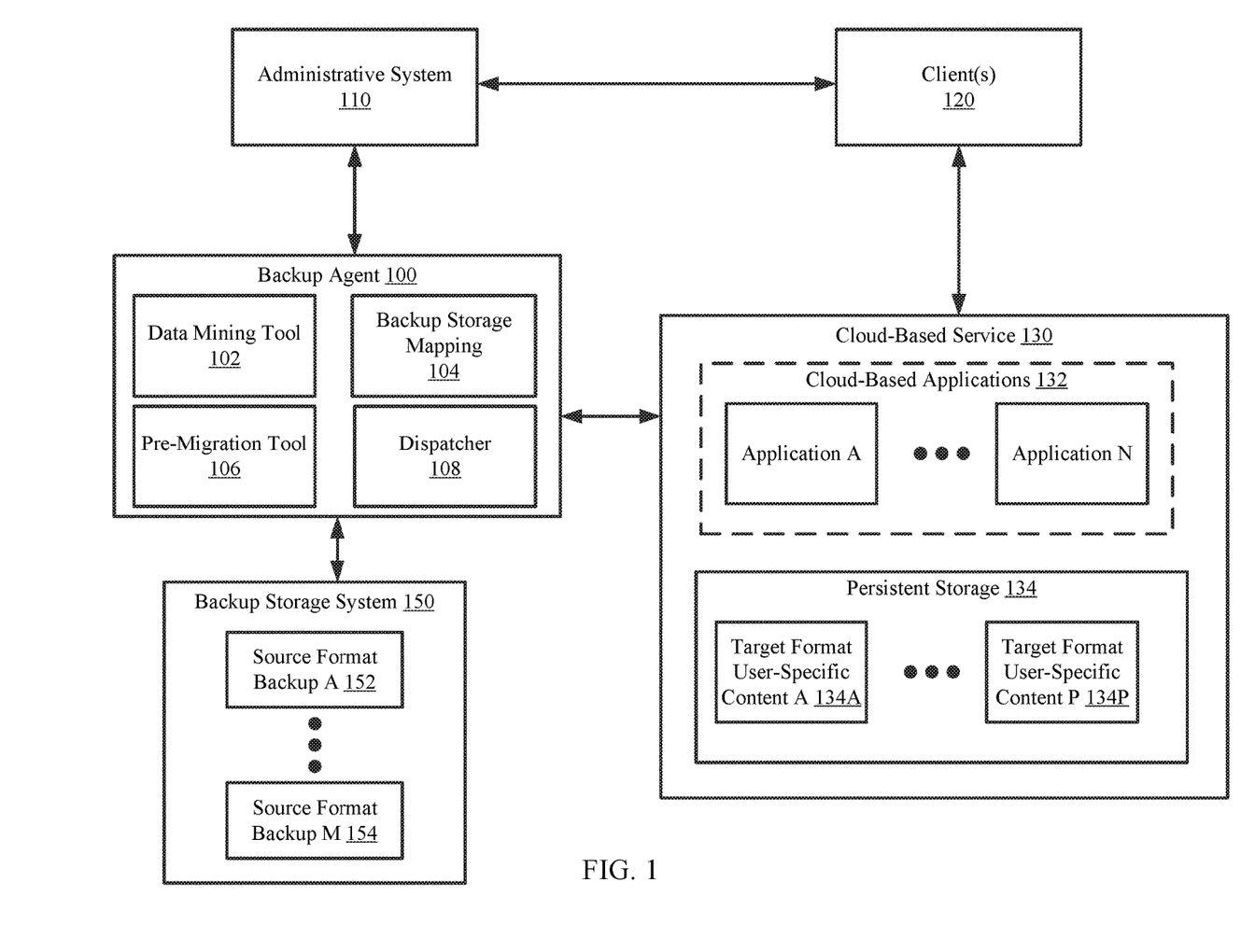
FIG. 1 shows a diagram of a system in accordance with one or more embodiments of the invention.

FIG. 1 shows a diagram of a system in accordance with one or more embodiments of the invention. The system may include one or more clients (120), an administrative system (110), a backup agent (100), a backup storage system (150), and a cloud-based service (130). The system may include additional, fewer, and/or different components without departing from the invention. Each component may be operably connected to any of the other components via any combination of wired and/or wireless connections. Each of the aforementioned components is discussed below.

In one or more embodiments of the invention, the backup agent (100) initiates the migration of user-specified content to the cloud-based service (130). The backup agent (100) may include a data mining tool (102) and a backup storage mapping (104). The backup agent (100) may include additional, fewer, and/or different components without departing from the invention.

In one or more embodiments of the invention, the data mining tool (102) analyzes the backups stored in the backup storage system (150) to identify the hierarchical structure of the user-specified content stored in the backup storage system. The data mining tool (102) may implement application programming interface (API) commands to the backup storage system (150) when performing the aforementioned analysis.

Figure 2A:
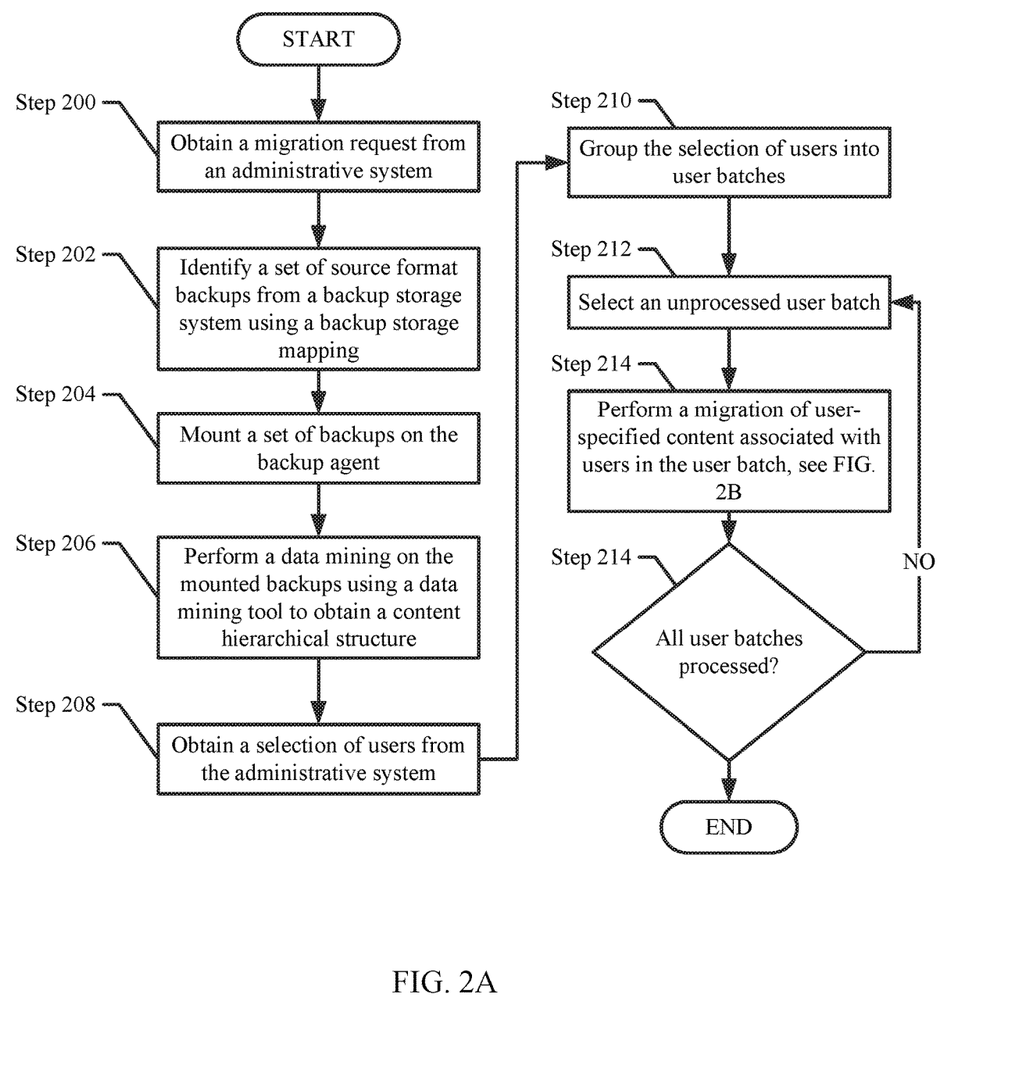
FIG. 2A shows a flowchart for servicing migration requests in accordance with one or more embodiments of the invention.
Figure 2B:
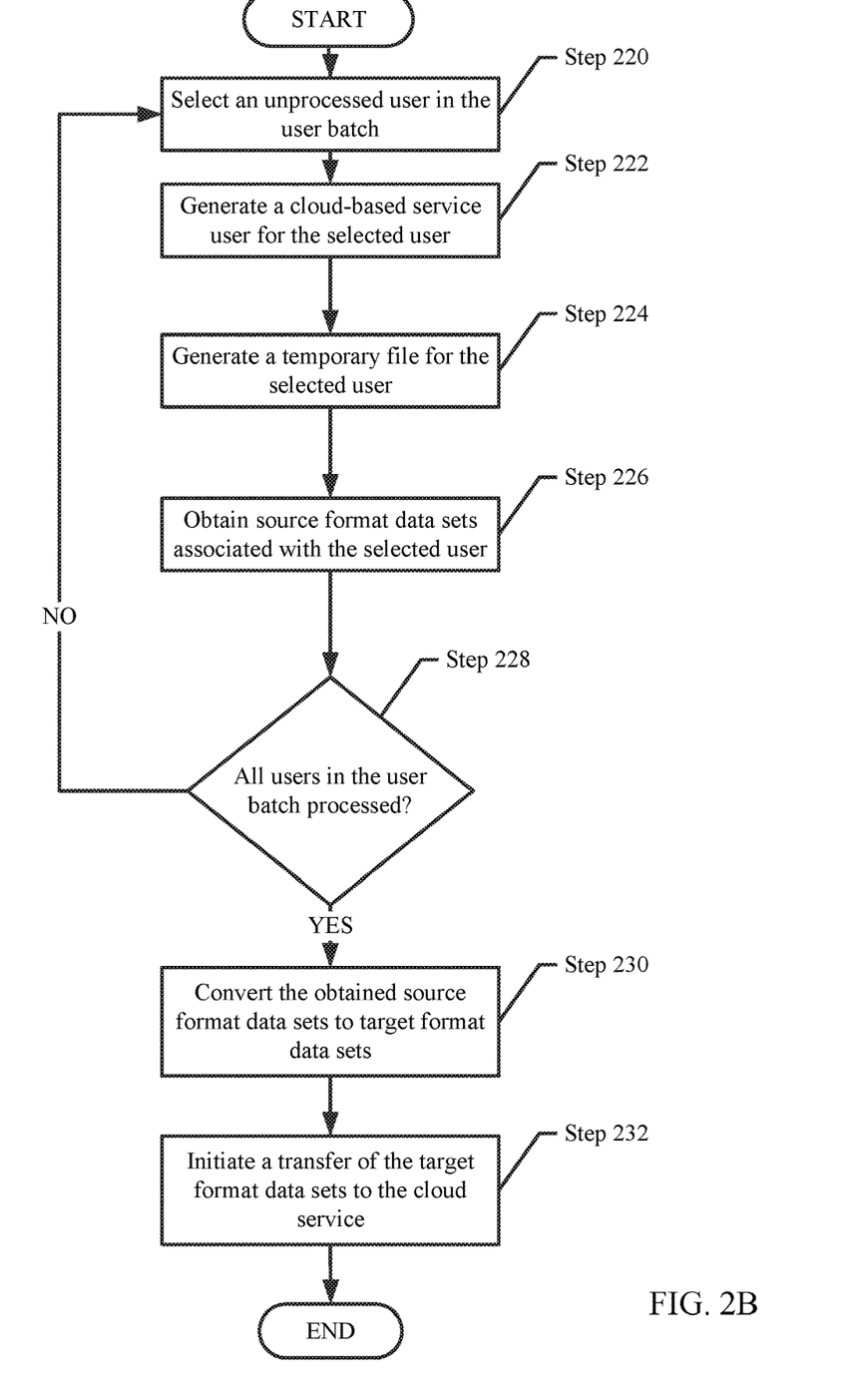
FIG. 2B shows a flowchart for performing a migration of user data in a user batch in accordance with one or more embodiments of the invention.

In one or embodiments of the invention, the data mining tool (102) is implemented as computer instructions, e.g., computer code, stored on a persistent storage that when executed by a processor of the backup agent (100) cause the backup agent (100) to provide the functionality of the data mining tool (102) described throughout this application and/or all, or a portion thereof, of the methods illustrated in FIGS. 2A-2B.

In one or more embodiments of the invention, the backup storage mapping (104) is a data structure that maps a source format of data to a target format of data. The backup storage mapping may specify the encoding information associated with a source format and the mapping of that encoding information to encoding information in a target format. In this manner, the backup storage mapping (104) enables the backup agent (100) to convert data stored in a source format to a target format.

For example, a source format may be in an Exchange database (.edb) format and a target format may be in an electronic mail (.eml) format. The backup storage mapping (104) may specify the internal structure of data in the .edb format and map it to the internal structure of the .eml format. The invention is not limited to the aforementioned formats.

In one or more embodiments of the invention, the pre-migration tool (106) groups users of a migration request into user batches. The users may be grouped based on any variety of factors such as, for example, number of total users to be migrated, potential size of data of each user, pre-determined priority, and/or any other factors without departing from the invention.

In one or embodiments of the invention, the pre-migration tool (106) is implemented as computer instructions, e.g., computer code, stored on a persistent storage that when executed by a processor of the backup agent (100) cause the backup agent (100) to provide the functionality of the pre-migration tool (102) described throughout this application and/or all, or a portion thereof, of the methods illustrated in FIGS. 2A-2B.

In one or more embodiments of the invention, the dispatcher (108) generates cloud-based user accounts for each user batch and performs the migration of user data to the cloud-based service in accordance with FIG. 2B. Specifically, the dispatcher (108) generates cloud-based service user accounts (discussed in FIG. 3B) for each user being migrated and converts data associated with each user to a target format to be accessed from the cloud-based service (130).

In one or more of embodiments of the invention, the dispatcher (108) is implemented as computer instructions, e.g., computer code, stored on a persistent storage that when executed by a processor of the backup agent (100) cause the backup agent (100) to provide the functionality of the dispatcher (108) described throughout this application and/or all, or a portion thereof, of the method illustrated in FIG. 2B.

Figure 4:
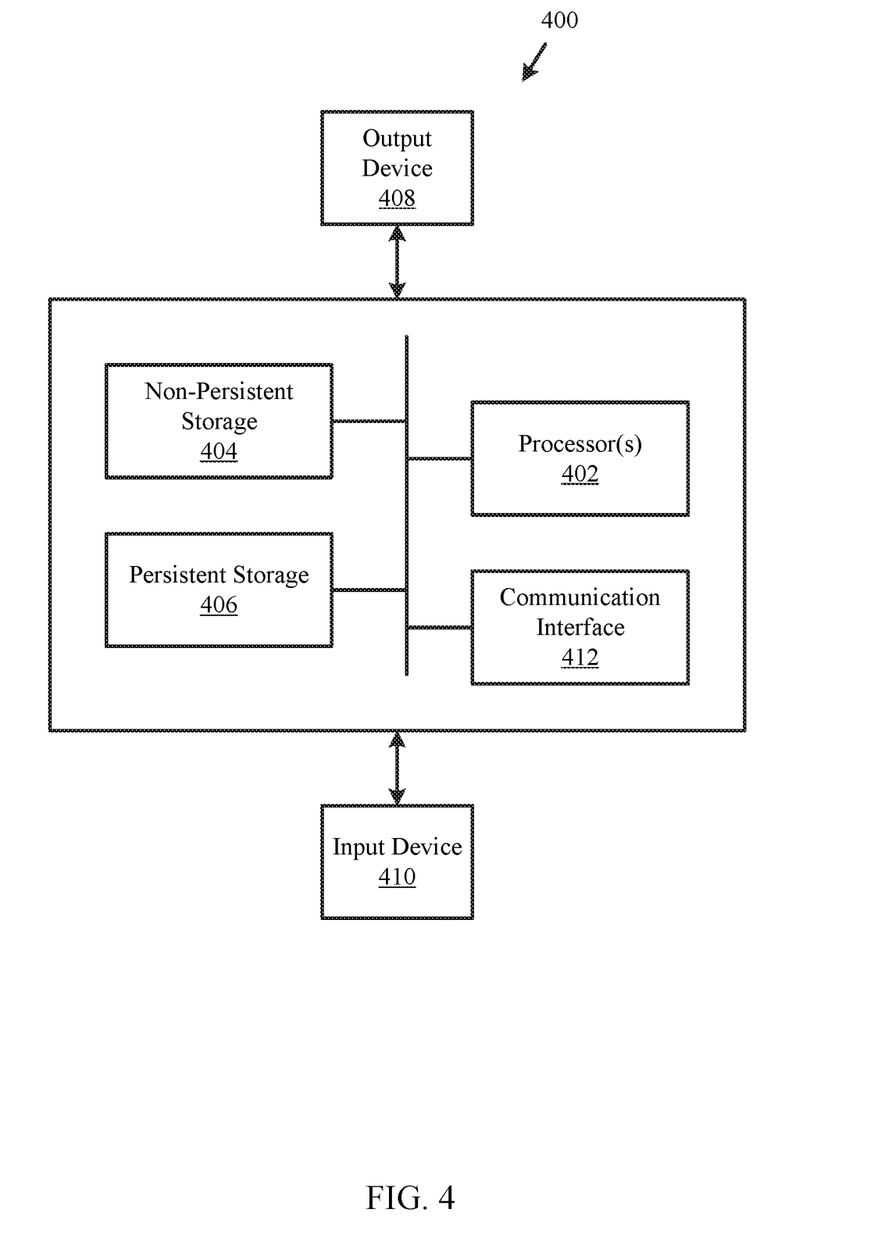
FIG. 4 shows a diagram of a computing device in accordance with one or more embodiments of the invention.

In one or more embodiments of the invention, the backup agent (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this application and/or all, or a portion thereof, of the methods illustrated in FIGS. 2A-2B.

In one or more embodiments of the invention, the backup agent (100) is implemented as a logical device. The logical device may utilize the computing resources of any number of computing devices and thereby provide the functionality of the backup agent (100) described throughout this application and/or all, or a portion thereof, of the methods illustrated in FIG. 2A-2B.

In one or more embodiments of the invention, the administrative system (110) is operated by one or more administrators that initiate the migration of the user-specified content from an on-premise environment to the cloud-based service (130). The administrative system (110) may send migration requests to the backup agent (100) to restore data to the cloud-based service (130).

In one or more embodiments of the invention, the administrative system (110) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the administrative system (110) described throughout this application.

In one or more embodiments of the invention, the administrative system (110) is implemented as a logical device. The logical device may utilize the computing resources of any number of computing devices and thereby provide the functionality of the administrative system (110) described throughout this application.

In one or more embodiments of the invention, the client(s) (120), operated by users, utilize services provided by the cloud-based service (130) and/or the administrative system (110). Specifically, the client(s) (120) may utilize the applications (132) of the cloud-based service (130) to obtain, modify, and/or store data. Further, the client(s) (120) may utilize the administrative system (110) to initiate a migration of user-specified content via the backup agent (100). The administrative system (110) may trigger a migration performed by the backup agent (100) by sending a migration request to the backup agent (100) that specifies the user-specified content.

In one or more embodiments of the invention, the clients (120) may utilize the cloud-based service (130) by utilizing user accounts that access the data associated with each user operating the clients (120). For example, a user may have access to user-specified content to which no other user has access. The user-specified content may be associated to a user account of the user. The user account may be generated by, for example, the dispatcher (108) in accordance with FIG. 2B. Alternatively, the user account may be generated using one or more of the cloud-based applications (132) provided by the cloud-based service (130).

In one or more embodiments of the invention, a client (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (120) described throughout this application.

In one or more embodiments of the invention, the client(s) (120) are implemented as a logical device. The logical device may utilize the computing resources of any number of computing devices and thereby provide the functionality of the client(s) (120) described throughout this application.

In one or more embodiments of the invention, the cloud-based service (130) host applications (132) (also referred to as cloud-based applications). The applications (132) may be logical entities executed using computing resources (not shown) of the cloud-based service (130). Each of the applications (132) may be performing similar or different processes. In one or more embodiments of the invention, the applications (132) provide services to users, e.g., clients (120). The applications may be, for example, instances of databases, email servers, and/or other applications without departing from the invention.

In one or more embodiments of the invention, the applications (132) are implemented as computer instructions, e.g., computer code, stored on a persistent storage (e.g., 134) that when executed by a processor(s) of a computing device (see, e.g., FIG. 4) cause the computing device to provide the functionality of the applications (132) described throughout this application.

In one or more embodiments of the invention, the cloud-based service (130) is implemented as a logical device. The logical device may utilize the computing resources of any number of computing devices and thereby provide the functionality of the cloud-based service (130) described throughout this application.

In one or more embodiments of the invention, the backup storage system (150) store backups of data. The backups (also referred to as source format backups) (152, 154), are stored in a source format. The backup storage system (150) may communicate with the backup agent (100) when transferring backups to the cloud-based service (130) for migrations of user-specified content. In one or more embodiments of the invention, a backup is a copy of data associated with an application (132) and/or other user-specified content. A backup may further include additional data that enables the backup agent (100) to restore the data.

In one or more embodiments of the invention, the backups (152, 154) stored in the backup storage system (150) are stored in the source format discussed above. In other words, the internal structure of the data in each of the source format backups (152, 154) are formatted in such a way that the data may be read by a computing device that understands the source format.

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

The invention is not limited to the system shown in FIG. 1.

FIG. 2A shows a flowchart for servicing migration requests in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. The method shown in FIG. 2A may be performed by, for example, a backup agent (100, FIG. 1). Other components of the system illustrated in FIG. 1 may perform the method of FIG. 2A without departing from the invention.

In step 200, a migration request is obtained for all or a portion of user-specified content. In one or more embodiments of the invention, the migration request is obtained from an administrative system. The administrative system, operated by an administrator, may specify, in the migration request, any number of users to be migrated to the cloud-based service. The migration may include generating cloud-based service user accounts for each user and transferring data corresponding to each user from a backup storage system to the cloud-based service.

In step 202, a set of source format backups are identified from a backup storage system. In one or more embodiments of the invention, the backup agent uses a backup storage mapping to identify the backups that may include the data associated with the specified users. In one embodiment of the invention, the backup storage mapping specifies which backups, e.g., on a per-user basis, are present in the backup storage system. The backup agent may identify the backups that are associated with the specified users of the migration request using the backup storage mapping.

In step 204, an identified set of backups are mounted on the backup agent. In one or more embodiments of the invention, when the set of backups are mounted a directory associated with the backups is generated such that the backup agent is able to read, write, and/or otherwise access the identified set of backups from the backup storage system. The backup agent includes functionality to identify, after the mounting, the source format(s) of the backups and/or any data associated with each backup.

In step 206, data mining is performed on the mounted backups using a data mining tool to obtain a content hierarchical structure. In one or more embodiments of the invention, the data mining tool includes functionality to read the source format backups and to identify a hierarchical structure of each backup in the identified set. The hierarchical structure may specify one or more metadata blocks (e.g., references) that reference and/or are otherwise associated with data blocks and/or other metadata blocks.

In one or more embodiments of the invention, the data mining is performed by sending application programming interface (API) commands to an exposed API of the backup storage system. The exposed API may return responses to the API commands that provide the requested information. The information of the responses may be used to generate the hierarchical structure.

For example, each backup may be a mailbox, or a collection of mailboxes, of a user. Each mailbox may include a set of files in which mail messages are stored. The hierarchical structure may specify the hierarchical structure in which the mailbox(es) of each backup is specified, the files and/or folders of the mailbox(es), and/or the messages associated with each file/folder. The mailbox may include other data and/or metadata without departing from the invention.

In step 208, a selection of users is obtained from the administrative system. The selection may specify the users that are to be migrated to the cloud-based service. The selection of users may be a subset of the users specified in the migration request of step 200.

The selection of users may be obtained in response to a set of options presented to the administrative system. The set of options may be presented in a manner such that the administrative system is able to select all or a portion of the specified users. The set of options may be presented via, for example, a graphical user interface (GUI). The GUI may enable the administrative system to select the desired users to be migrated.

In step 210, the selection of users are grouped into user batches. In one or more embodiments of the invention, a pre-migration tool of the backup agent groups the selected users based on, for example, an amount of data that is to be migrated for each user batch.

For example, if each selected user is associated with ten gigabytes (GBs) of data, and the migration may be capable of migrating 100 GB of data in a user batch, then the selected users may be grouped into user batches of ten users per user batch. The selected users may be grouped via other grouping mechanisms without departing from the invention.

In step 212, an unprocessed user batch is selected.

In step 214, a migration of user-specified content associated with each user in the selected user batch is performed. In one or more embodiments of the invention, the migration is performed via the method of FIG. 2B. The migration may be performed via other methods without departing from the invention. After the migration is performed for the selected user batch, the selected user batch may be marked as processed.

In step 216, a determination is made about whether all user batches are processed. If all user batches are processed, the method may end following step 216; otherwise, the method proceeds to step 212.

FIG. 2B shows a flowchart for performing a migration of users in a user batch in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. The method shown in FIG. 2B may be performed by, for example, a backup agent (100, FIG. 1). Specifically, the method may be performed by the dispatcher (108, FIG. 1) of the backup agent. Other components of the system illustrated in FIG. 1 may perform the method of FIG. 2B without departing from the invention.

Turning to FIG. 2B, in step 220, an unprocessed user in the user batch is selected.

In step 222, a cloud-based service user account is generated for the selected user. In one or more embodiments of the invention, the cloud-based service user account is generated by inputting metadata associated with the user (e.g., a username, a first name, a last name, etc.) into a new account of the cloud-based service and associating the new account to the user. The new account may be associated with the user by, for example, generating a temporary password and providing the temporary password to the user. In this way, the user may access the generated cloud-based service user account and any data associated with the cloud-based service user account (e.g., data that is transferred in step 232). The process of generating the cloud-based service user account may be performed using APIs provided by the cloud-based service.

In step 224, a temporary file is generated for the selected user. The temporary file may portions of disk space that may be allocated to the user in which data associated with the user may be stored.

In step 226, source-format data sets associated with the selected user are obtained from the backup storage system. In one or more embodiments of the invention, the source-format data sets may be obtained using the hierarchical structure generated in FIG. 2A. The hierarchical structure may specify all data sets (e.g., mailboxes) associated with the selected user. The dispatcher may transfer the identified data sets to the backup agent and stored them in the temporary file of step 224.

In one or more embodiments of the invention, the identified source-format data sets are obtained using the exposed API of the backup storage system. The backup agent may send API commands to the backup storage system to obtain the identified source-format data sets based on the hierarchical structure. The source-format data sets may each be all or a portion of a source format backup.

In one or more embodiments of the invention, after the source formats for the selected user are obtained, the selected user may be marked as processed.

In step 228, a determination is made about whether all users in the user batch have been processed. If all users in the user batch have been processed, the method proceeds to step 230; otherwise, the method proceeds to step 220.

In step 230, the obtained source-format data sets of all users in the user batch are converted from the source format to a target format. In one or more embodiments of the invention, the obtained source-format data sets are converted using a backup storage mapping. The backup storage mapping may include information that enables the backup agent to convert the data sets from the source format to the target format. For example, the backup storage mapping specifies a mapping between each entity (e.g., a file, a folder, a mailbox, a metadata field) specified in the source format with an entity in the target format. The result of the conversion, using the backup storage mapping, may be target-format data sets.

In step 216, a transfer is initiated of the target-format data sets to the cloud-based service. In one or more embodiments of the invention, the transfer includes sending requests to an API of the cloud-based service to access the persistent storage of the cloud-based service. The requests may specify the users in the user batch and/or the target-format data sets. The cloud-based service API may perform a verification that enables the cloud-based service to confirm that the backup agent (on the user's behalf) may initiate the transfer of the target-format data sets. After the transfer is verified, the backup agent initiates the transfer of the target-format data sets.

In one or more embodiments of the invention, the backup agent exports the target-format data sets to the cloud-based service. The backup agent may obtain the confirmation from the cloud-based service and send the target-format data sets in the cloud-based service. The cloud-based service may subsequently store the target-format data sets in the persistent storage of the cloud-based service and associate each target-format data set to the corresponding specified user. In this manner, each user is able to access the target-format data set from the cloud-based service.

Example

Figure 3A:
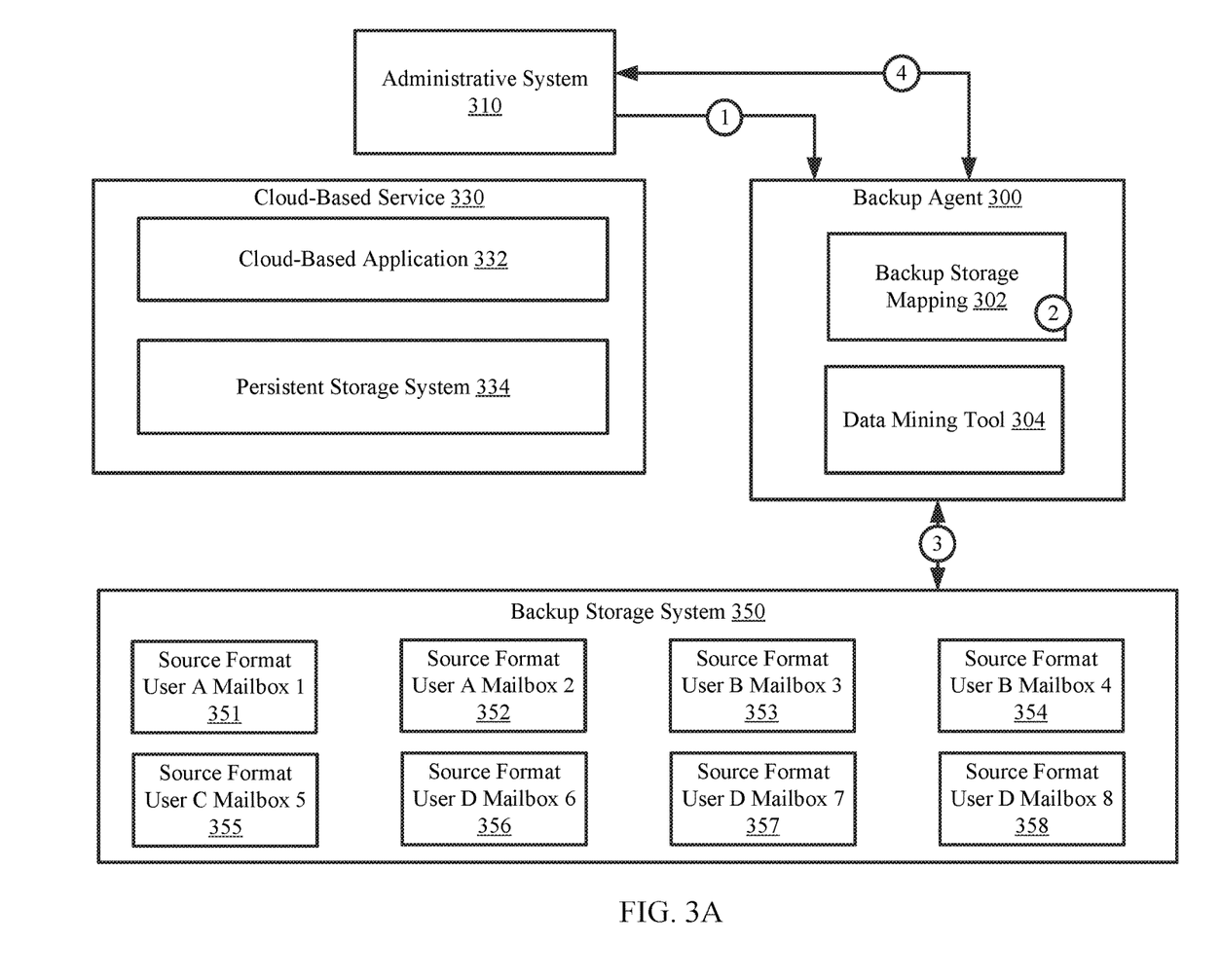
FIGS. 3A-3C show an example in accordance with one or more embodiments of the invention.
Figure 3B:
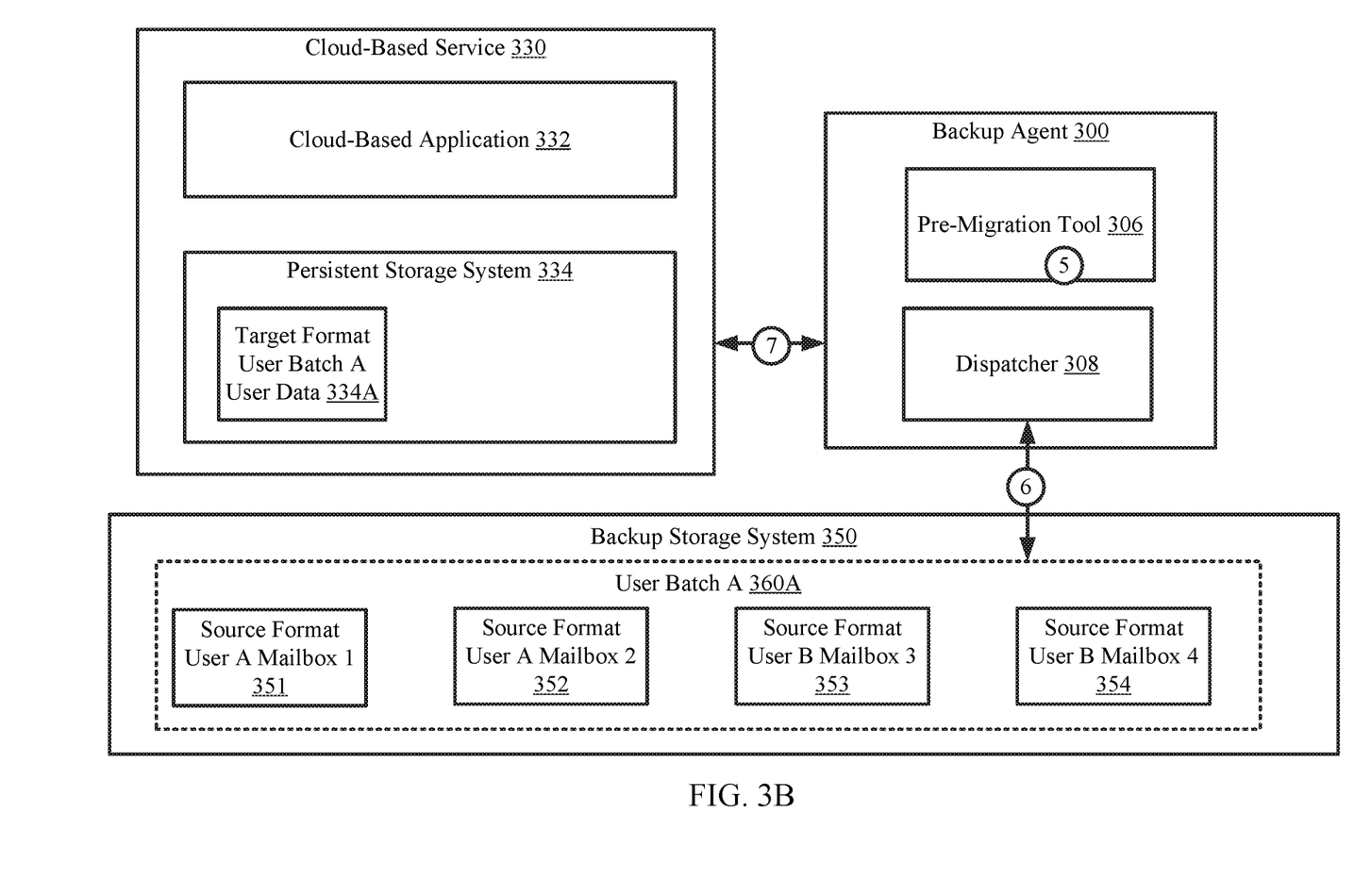
Figure 3C:
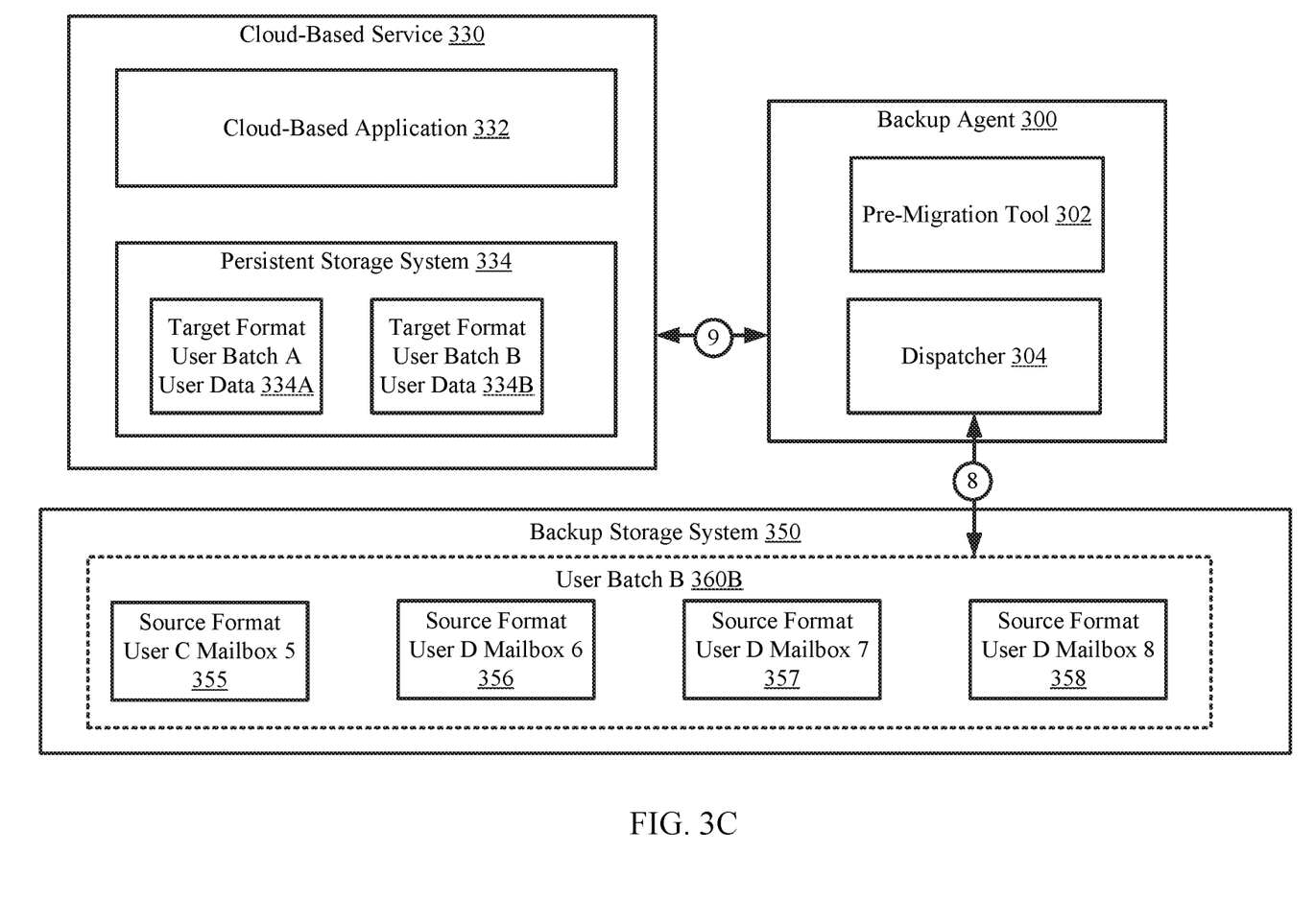

The following section describes an example. The example, illustrated in FIGS. 3A-3C, is not intended to limit the invention. Turning to the example, consider a scenario in which a system is performing a migration of users from data in an offline backup storage system to a cloud-based service. FIG. 3A shows an example system. The system includes a backup agent (300), an administrative system (310), the cloud-based service (330), and the backup storage system (350). The cloud-based service (330) includes an application (332) and a persistent storage (334).

The example system performs a method similar to that of FIG. 2A to restore user-specified content such as mailboxes. Specifically, the administrative system (310) sends a migration request to the backup agent to migrate users and their corresponding data to a cloud-based service [1]. The backup agent (300) utilizes a backup storage mapping (302) to identify one or more source format backups (351, 352, 353, 354, 355, 356, 357, 358) stored in the backup storage system (350) that may be migrated [2]. The source format backups are labeled as source format user A mailbox 1 (351), source format user A mailbox 2 (352), source format user B mailbox 3 (353), source format user B mailbox 4 (354), source format user C mailbox 5 (355), source format user D mailbox 6 (356), source format user D mailbox 7 (357), and source format user D mailbox 8 (358).

The backup agent (310) mounts the identified backups (351, 352, 353, 354, 355, 356, 357, 358) onto the backup agent (310) [3]. The backup agent (310) performs a data mining using a data mining tool (304) on the mounted backups to obtain a hierarchical structure of the user-specified content stored in the backups. The hierarchical structure identifies users A, B, C and D. Each user has one or more mailboxes stored in the backup storage system (350) in a source format. User A is associated with mailboxes 1 and 2 (351, 352), user B is associated with mailboxes 3 and 4 (353, 354), user C is associated with mailbox 5 (355), and user D is associated with mailboxes 6, 7, and 8 (356, 357, 358).

The backup agent provides a set of options to the administrative system (310) for what users are to be migrated to the cloud based service (330) [4]. The administrative system (310) responds with a selection of users to be migrated. The selection is users A, B, C, and D.

As shown in FIG. 3B, a pre-migration tool (306) of the backup agent (300) groups the selection of users into user batches [5]. A first user batch includes users A and B.

A dispatcher (308) of the backup agent (310) performs the method of FIG. 2B to migrate user data associated with the first user batch (360A) to the cloud service. Specifically, the dispatcher (308) generates temporary files in which to store the user data of user batch A (360A) [6]. The user data includes source format mailboxes 1-4 (351, 352, 353, 354). Once the user data of user batch A (360A) is obtained and stored, the dispatcher (308) converts the mailboxes (351, 352, 353, 354) to the target format (e.g., .eml).

The backup agent (308) further initiates the transfer of the target format user data to the cloud based service (330) [7]. The target format user data for batch A (334A) may be stored in persistent storage (334) of the cloud-based service (330) to be utilized by a cloud-based application (332) of the cloud-based service (330).

As shown in FIG. 3C, the dispatcher (308) performs the method of FIG. 2B to migrate user data associated with the second user batch (360B) to the cloud service. Specifically, the dispatcher (308) generates temporary files in which to store the user data of user batch B (360B) [8]. The user data includes source format mailboxes 5-8 (355, 356, 357, 358). Once the user data of user batch B (360B) is obtained and stored, the dispatcher (308) converts the mailboxes (355, 356, 357, 358) to the target format (e.g., .eml).

The backup agent (308) further initiates the transfer of the target format user data to the cloud based service (330) [9]. The target format user data of batch B (334B) may be stored in persistent storage (334) of the cloud-based service (330) to be utilized by a cloud-based application (332) of the cloud-based service (330).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of migrating data originally stored in one source format in a cloud-service that accesses data in a target format. Embodiments of the invention may enable a backup agent to generate user accounts associated with users of the source-format data sets in a first environment. The user accounts may enable the users to access the data from a second cloud-based environment. Embodiments of the invention minimize the administrative effort of migrating a large number of users and a large amount of user data by automatically generating the user accounts and transferring the data from an on-premise environment to a cloud-based data environment.

Thus, embodiments of the invention may address the problem of inefficient use of computing resources. This problem arises due to the technological nature of the environment in which data is managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
    obtaining, by a backup agent, a migration request, wherein the migration request specifies a plurality of users; and
    in response to the migration request:
        identifying a set of source-format data sets in a backup storage system;
        mounting the set of source-format data sets from the backup storage system;
        performing data mining on the set of source-format data sets in response to the mounting to obtain a hierarchical structure;
        generating a cloud-based service user account for each user of the plurality of users, wherein the cloud-based service user accounts are associated with a cloud-based service;
        obtaining a second set of source-format data sets associated with each user of the plurality of users using the hierarchical structure; and
        initiating a migration of the second set of source-format data sets to the cloud-based service.

2. The method of claim 1, wherein initiating the migration of the second set of source-format data sets comprises:
    generating temporary files for the plurality of users;
    storing the second set of source-format data sets in the temporary files;
    converting the second set of source-format data sets to target-format data sets using a backup storage mapping wherein the backup agent comprises a backup storage mapping, a dispatcher, and a data mining tool; and
    initiating a transfer of the target-format data sets to the cloud-based service.

3. The method of claim 1, wherein the second set of source-format data sets are initially stored in the backup storage system.

4. The method of claim 1, wherein the hierarchical structure specifies at least one source-format data set associated with a user of the plurality of users.

5. The method of claim 1, wherein a source format data set of the second set of source-format data sets is a mailbox in a source format, and wherein a target-format data set is the mailbox in a target format.

6. The method of claim 1, wherein prior to generating the cloud-based service user accounts, the plurality of users are grouped into user batches.

7. The method of claim 6, wherein initiating a migration of the second set of source-format data sets is performed on a per-user batch basis.

8. A system, comprising:
    a processor; and
    memory comprising instructions which, when executed by the processor, perform a method, the method comprising:
        obtaining, by a backup agent, a migration request, wherein the migration request specifies a plurality of users; and
        in response to the migration request:
            identifying a set of source-format data sets in a backup storage system;
            mounting the set of source-format data sets from the backup storage system;
            performing data mining on the set of source-format data sets in response to the mounting to obtain a hierarchical structure;
            generating a cloud-based service user account for each user of the plurality of users, wherein the cloud-based service user accounts are associated with a cloud-based service;
            obtaining a second set of source-format data sets associated with each user of the plurality of users using the hierarchical structure; and
            initiating a migration of the second set of source-format data sets to the cloud-based service.

9. The system of claim 8, wherein initiating the migration of the second set of source-format data sets comprises:
    generating temporary files for the plurality of users;
    storing the second set of source-format data sets in the temporary files;
    converting the second set of source-format data sets to target-format data sets using a backup storage mapping wherein the backup agent comprises a backup storage mapping, a dispatcher, and a data mining tool; and initiating a transfer of the target-format data sets to the cloud-based service.

10. The system of claim 8, wherein the second set of source-format data sets are initially stored in the backup storage system.

11. The system of claim 8, wherein the hierarchical structure specifies at least one source-format data set associated with a user of the plurality of users.

12. The system of claim 8, wherein a source format data set of the second set of source format data sets is a mailbox in a source format, and wherein a target-format data set is the mailbox in a target format.

13. The system of claim 8, wherein prior to generating the cloud-based service user accounts, the plurality of users are grouped into user batches.

14. The system of claim 8, wherein initiating a migration of the second set of source-format data sets is performed on a per-user batch basis.

15. A non-transitory computer readable medium comprising computer readable program code, which when executed by a computer processor enables the computer processor to perform a method for managing data, the method comprising:
   obtaining, by a backup agent, a migration request, wherein the migration request specifies a plurality of users; and
   in response to the migration request:
      identifying a set of source-format data sets in a backup storage system;
      mounting the set of source-format data sets from the backup storage system;
      performing data mining on the set of source-format data sets in response to the mounting to obtain a hierarchical structure;
      generating a cloud-based service user account for each user of the plurality of users, wherein the cloud-based service user accounts are associated with a cloud-based service;
      obtaining a second set of source-format data sets associated with each user of the plurality of users using the hierarchical structure; and
      initiating a migration of the second set of source-format data sets to the cloud-based service.

16. The non-transitory computer readable medium of claim 15, wherein initiating the migration of the second set of source-format data sets comprises:
   generating temporary files for the plurality of users;
   storing the second set of source-format data sets in the temporary files;
   converting the second set of source-format data sets to target-format data sets using a backup storage mapping wherein the backup agent comprises a backup storage mapping, a dispatcher, and a data mining tool; and
   initiating a transfer of the target-format data sets to the cloud-based service.

17. The non-transitory computer readable medium of claim 15, wherein the second set of source-format data sets are initially stored in the backup storage system.

18. The non-transitory computer readable medium of claim 15, wherein the hierarchical structure specifies at least one source-format data set associated with a user of the plurality of users.

19. The non-transitory computer readable medium of claim 15, wherein a source format data set of the second set of source-format data sets is a mailbox in a source format, and wherein a target-format data set is the mailbox in a target format.

20. The non-transitory computer readable medium of claim 15, wherein prior to generating the cloud-based service user accounts, the plurality of users are grouped into user batches, and wherein initiating a migration of the second set of source-format data sets is performed on a per-user batch basis.

* * * * *